United States Patent [19]

Nissley

[11] Patent Number: 5,305,715
[45] Date of Patent: Apr. 26, 1994

[54] SUPPLEMENT FUEL GENERATOR FOR VEHICLE ENGINES

[75] Inventor: Ira C. Nissley, Williamsburg, Iowa

[73] Assignee: Alira, Inc., Keosauqua, Iowa

[21] Appl. No.: 107,931

[22] Filed: Aug. 17, 1993

Related U.S. Application Data

[63] Continuation of Ser. No. 137, Jan. 4, 1993, abandoned, which is a continuation of Ser. No. 810,101, Dec. 19, 1991, abandoned.

[51] Int. Cl.⁵ .............................................. F02B 93/08
[52] U.S. Cl. .................................. 123/3; 123/DIG. 12
[58] Field of Search ........................... 123/3, DIG. 12; 204/129, 242, 278, 293

[56] References Cited

U.S. PATENT DOCUMENTS

| | | | |
|---|---|---|---|
| 2,509,498 | 5/1950 | Heyl | 123/DIG. 12 |
| 4,023,545 | 5/1977 | Mosher et al. | 123/3 |
| 4,361,474 | 11/1982 | Shoof et al. | 123/3 |
| 5,186,805 | 2/1992 | Gross et al. | 204/265 |

Primary Examiner—Noah P. Kamen
Attorney, Agent, or Firm—James C. Nemmers

[57] ABSTRACT

A system for generating hydrogen and oxygen gases that are mixed with fuel supplied to the engine of a vehicle. The system includes a generating unit that utilizes electrolysis to produce the gases from the electrolyte. The anode and cathode plates of the generating unit are made of stainless steel, and the electrolyte is glacial acetic which produces the hydrogen and oxygen with a minimum amount of sediment and no deterioration of the plates.

3 Claims, 1 Drawing Sheet

SUPPLEMENT FUEL GENERATOR FOR VEHICLE ENGINES

This application is a continuation of application Ser. No. 08/000,137, filed Jan. 4, 1993, now abandoned, which is a continuation of Ser. No. 07/810,101 filed Dec. 19, 1991, now abandoned.

BACKGROUND OF THE INVENTION

There are a number of known systems for producing hydrogen and oxygen gases from an electrolyte, which gases are used to supplement fuel supplied to a vehicle engine. The hydrogen and oxygen gases are generally formed in a generating unit by electrolysis of the electrolyte. The gases are then introduced into the air intake of the engine. By supplementing the fuel, mileage is improved and emissions reduced.

Although there are known numerous supplemental fuel systems using the principles of electrolysis, they have not been commercially successful because of cost, problems with sediment contaminating the anode and cathode plates, safety reasons and failure to produce significant results. Numerous attempts have been made to correct the various problems. For example, in Moshier U.S. Pat. No. 4,023,545 and Glynn U.S. Pat. No. 4,442,801 "pusher" gases are used to sweep the plates in the generating unit. Systems using pusher gases are relatively complicated. Also, attempts have been made to raise the plates above the bottom of the convertor unit so that as sediment builds up in the unit it will not contaminate the plates and reduce the efficiency of the unit. There have also been attempts at improving the efficiency of these hydrogen generation units by changes in various materials in the plates and by using various electrolyte compositions. Brown U.S Pat. No. 3,793,079 and Olivera U.S. Pat. No. 4,528,947 are examples of attempts to resolve the problems by changes in the composition of the electrolyte. However, none of these prior art teachings has resulted in an efficient, workable unit that produces increased fuel efficiency and reduced emissions. Especially in current times, reduction of emissions is not only important, but with increasing frequency, regulatory agencies are imposing standards which must be met by vehicle manufacturers and users. In addition, fuel efficiency standards are repeatedly being raised and are becoming more difficult to meet with cost effective techniques.

There is therefore a need for ways to improve the fuel efficiency and to reduce engine emissions of vehicles. There is a further need for producing improved fuel efficiencies and reduced emissions in a cost effective manner. Any such ways of improving fuel efficiency and reducing emissions should also be easy to use and maintain and meet all safety criteria.

SUMMARY OF THE INVENTION

In the system of the invention, the hydrogen generating unit is provided with a plurality of vertically oriented cathode and anode plates constructed of a non-reactive material, such as stainless steel. The unit contains an electrolyte consisting of glacial acetic acid and distilled water. This electrolyte is noncaustic and produces a unit that will operate over an extended period of time with practically no deterioration of the plates and little or no sediment.

DESCRIPTION OF THE PREFERRED EMBODIMENT OF THE INVENTION

Figure 1:
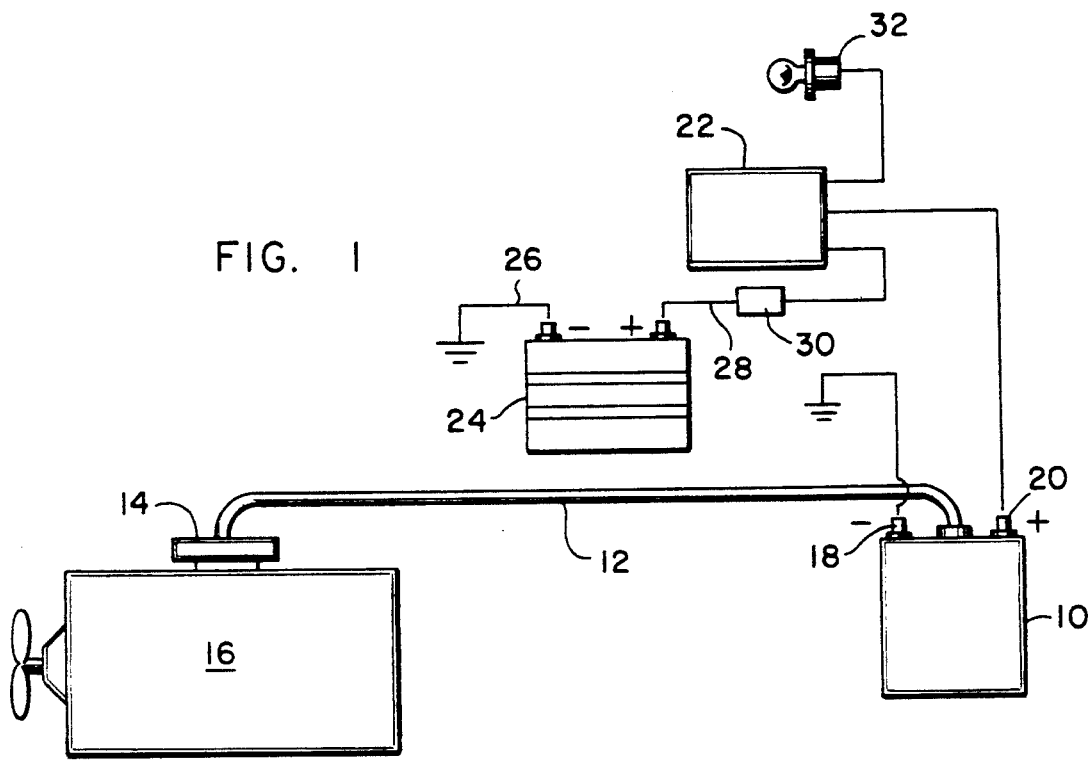
FIG. 1 is a schematic diagram of the system of the invention illustrating the basic connections between the generating unit and the vehicle engine.

Referring to the drawings, FIG. 1 shows a schematic diagram of a system suitable for employing the principles of the invention in which a generating unit, indicated generally by the reference numeral 10, contains an electrolyte that, through electrolysis, produces hydrogen and oxygen gases which re discharged through line 12 that is connected to the air intake 14 of a vehicle engine 16. The generating unit 10 has a negative terminal 18 connected to ground and a positive terminal 20 connected to a solenoid 22. The storage battery 24 of the vehicle has its negative terminal 26 connected to ground and its positive terminal 28 connected through breaker 30 to the solenoid 22. The ignition switch 32 of the vehicle is connected to solenoid 22 so that the generating unit 10 will be connected in the circuit only if the ignition switch 32 is turned on.

Figure 2:
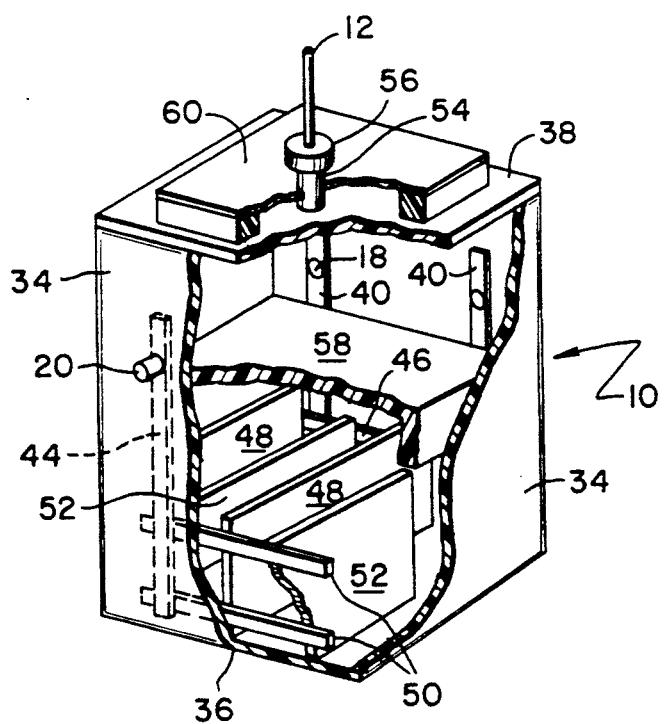
FIG. 2 is a perspective view of a generating unit with a portion of the side walls removed to show the interior structure.

Referring now to FIG. 2, the generating unit 10 is a fluid container that has side walls 34, a bottom wall 36 and a top wall 38. On opposite ones of the side walls 34 are secured vertical conductors 40 and 44 which are spaced apart and suitably secured to the side walls 34. Connected to at least one of the vertical conductors 40 on one side wall 34 is the negative terminal 18 that extends through the side wall 34 for connection in the circuit as shown in FIG. 1. Similarly, vertical conductors 44 are secured to the side wall 34 opposite the vertical conductors 40, and the positive terminal 20 is connected through the side wall 34 for connection in the circuit of FIG. 1.

Welded or otherwise suitably connected across the vertical conductors 40 and 44 are one or more horizontal conductors 46 and 50, respectively. Welded or otherwise suitably connected to the horizontal conductors 46 are a plurality of cathode plates 48, the bottom edges of which are preferably slightly above the bottom wall 36 of the generating unit 10. As best seen in FIG. 2, the cathode plates 48 are vertically oriented and spaced apart. Extending between the cathode plates 48 from the opposite side wall 34 and welded to horizontal conductors 50 are a plurality of anode plates 52. The anode plates 52 are alternately spaced with the cathode plates 48, and similar to the cathode plates 48 the bottom edges of anode plates 52 are positioned slightly above the bottom wall 36 of the generating unit 10.

Preferably, the cathode plates 48 and anode plates 52 are constructed of stainless steel of 14 or 16 gauge. Stainless steel provides the necessary structural integrity required where the unit is to be installed in vehicles.

The size and spacing of the cathode plates 48 and anode plates 52 are somewhat critical, with the size, number and spacing of the plates being determined by the size and capacity of the generating unit 10 that will be needed. For example, if the generating unit 10 has a bottom wall 36 that is approximately nine (9) inches square and the height of the side walls 34 is nine (9) inches, I have found that the use of two cathode plates 48 and three anode plates 52, each approximately three (3) inches by five (5) inches and spaced approximately one-half (½) inch apart, will produce the desired results. Also, a generating unit 10 that is 9"×9"×16" will require two cathode plates 48 and three anode plates 52, each 5"×7" and spaced approximately one (1) inch apart, while a unit 10 that is 11"×11"×16" requires three cathode plates 48 and four anode plates 52, each 7"×9" and spaced approximately one (1) inch apart.

The type of electrolyte used in the generating unit 10 is critical. It has been determined that the use of a solution of acetic acid as an electrolyte is essential. Acetic acid is a noncaustic electrolyte and will not react with the cathode plates 48 and anode plates 52. Thus, even after extended use, no deterioration of the plates 48 or 52 occurs. Moreover, acetic acid provides the necessary electron transfer for the electrolysis process, but the acetic acid does not break down, and therefore there is little or no sediment produced in the generating unit 10 even after extended use. In prior art devices, sediment has been a problem. I have found that an electrolyte containing 1% to 4% acetic acid in distilled water will produce optimum results. Glacial acetic acid is approximately 90% acetic acid and 10% distilled water and is readily available for use as an electrolyte in the generation unit 10 of the invention. With a concentration of acetic acid in the foregoing indicated range, the electrolyte will keep the cathode plates 48 and anode plates 52 clean, and the acetic acid solution will create its own buffer and removes the gas bubbles from the plates 48 and 52. Concentrations of 1% to 4% of acetic acid will produce the optimum results. This concentration of acetic acid in distilled water will put the proper pressure on the chemical reaction occurring in the electrolysis process, and thus produce higher amounts of hydrogen gas. Concentrations of acetic acid above 4% will function, but may cause overheating in the generator. On the other hand, concentrations of acetic acid less than 1% will not generate sufficient electron transfer to produce the necessary hydrogen gas to make an efficiently operating generating unit.

In order to capture the hydrogen gas produced in the generating unit 10, generating unit 10 has a discharge tube 54 containing a removable cap 56 that is in turn connected to the air tube 12. Removable cap 56 provides for introduction of the electrolyte into the interior of the generating unit 10. I also prefer to provide a honeycomb cover 58 above the cathode plates 48 and anode plates 52 to prevent excessive splashing of the electrolyte and maintain the solution over the plates 48 and 52. In addition, an air filter 60 is preferably provided on the top wall 38 surrounding the discharge tube 54 in order to keep dust and other impurities out of the system.

Preliminary tests using a generating unit constructed according to the principles of the invention have produced reductions in toxic exhaust emissions as high as 76% while increasing favorable oxygen emissions by 80%. Units have also increased fuel mileage from 16% to 31% depending upon the particular vehicle and the driving habits of the operator. Addition of hydrogen gas and oxygen into the vehicle engine increases the burning efficiency of both diesel and gasoline fuels. Moreover, it has been shown that injector nozzles and combustion chambers are cleaner than engines which do not employ a generating unit of the invention. Thus, use of the generating unit of the invention will allow the vehicle engine to develop more horse power with greater efficiency, run cleaner and emit less toxic pollutants.

Since the generating unit and system of the invention does not store hydrogen at any time, but merely injects hydrogen and oxygen directly into the engine as they are produced, the unit is completely safe. When the engine is not operating, the generating unit is similarly not operating. It is therefore quite apparent that use of the generating unit of the invention will produce significant improvements in vehicle performance, power, fuel efficiency and reduced emissions.

Having thus described the invention in connection with the preferred embodiment thereof, it will be evident to those skilled in the art that various revisions and modifications can be made to the preferred embodiment without departing from the spirit and scope of the invention. It is my intention, however, that all such revisions and modifications as are obvious to those skilled in the art will be included within the scope of the following claims.

What is claimed is as follows:

1. A gas generating unit for use with vehicle engines having a source of electrical energy and also having an intake for supplying a fuel-air mixture to the engine, said unit comprising an electrolysis unit having bottom and top walls joined by side walls to form an enclosed unit, a positive terminal and a negative terminal combined with said unit for connecting the unit in circuit with the source of electrical energy to supply said energy to the unit only when the engine is operating, at least one vertically-oriented cathode plate in said unit connected to the negative terminal of the electrolysis unit, at least one vertically-oriented anode plate spaced from the cathode plate in said unit and connected to the positive terminal of the electrolysis unit, said cathode and anode plates being made of stainless steel, an electrolyte solution contained in said enclosed electrolysis unit and completely submerging the cathode and anode plates, the electrolyte consisting only of acetic acid and distilled water in a concentration of one to four percent of acetic acid, and means for connecting the electrolysis unit to the air intake of the engine to convey gases generated from the electrolyte solution to said engine air intake.

2. The gas generation of claim 1 in which there is provided a cover positioned over the electrolyte solution in the unit, the cover allowing the passage of the gas generated within the unit by the electrolyte while maintaining the electrolyte solution over the cathode and anode plates and preventing excessive splashing of the electrolyte solution.

3. The gas generation unit of claim 2 in which there is a discharge tube extending through the top wall of the unit to convey the gases generated from the electrolyte solution to the engine air intake and there is combined with the top wall surrounding the discharge tube an air filter to prevent impurities from entering the unit.

* * * * *